United States Patent Office 3,177,252
Patented Apr. 6, 1965

3,177,252
ORTHO ALKOXY AND ALKYLTHIO-POLY-
SUBSTITUTED - N - TERTIARYAMINO-AL-
KYL BENZAMIDES
Michel Léon Thominet, Paris, France, assignor to Societe
d'Etudes Scientifiques et Industrielles de l'Ile-de-France,
Paris, France, a society of France
No Drawing. Filed July 17, 1962, Ser. No. 210,554
Claims priority, application France, July 25, 1961,
869,010; July 25, 1961, 869,011
6 Claims. (Cl. 260—559)

This invention relates to substituted benzamides having the formula:

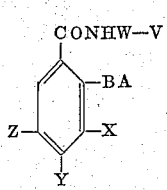

in which V is a group having either of the following formulas:

or

in which $R_1$ and $R_2$ are lower alkyl groups such as the methyl, ethyl, propyl or isopropyl group; L is nitrogen, oxygen, the methylene group or a group having the formula: NR, in which R is hydrogen or a lower alkyl group, such as a methyl or isopropyl group; W is an alkylene group, such as the ethylene, propylene, methyl ethylene or 2-methyl propylene group; A is a lower alkyl group such as the methyl, isopropyl, or isobutyl group; B is sulfur or oxygen; and X, Y and Z are hydrogen, halogens, such as chlorine, bromine or fluorine, lower alkoxy groups, such as the methoxy, ethoxy, isopropoxy and butoxy group, the amino group, lower alkylamino groups, such as the methylamino or isobutylamino group, di lower alkylamino groups, such as the diethylamino or dipropylamino group, lower acyl groups, such as $COCH_3$ or $COC_2H_5$, lower acylamino groups, lower alkyl mercapto groups, such as the mercaptomethyl, mercaptoethyl or mercaptobutyl group, the sulfamoyl group, lower alkylsulfamoyl groups, such as the methylsulfamoyl or butylsulfamoyl group, di lower alkylsulfamoyl groups, such as the dipropylsulfamoyl group, or halomethyl groups, such as the trichloromethyl, tribromomethyl or trifluoromethyl group. At least two of X, Y and Z are one of the specified substituents and not more than one of X, Y and Z is hydrogen. When, however, B is sulfur or one of the substituents, X, Y or Z is a sulfamoyl group, lower alkylsulfamoyl group or di lower alkylsulfamoyl group, the other two remaining of X, Y and Z need not be substituted with any of the specified groups and may be simply hydrogen.

The substituted benzamides of the present invention are prepared from substituted 2-alkoxy benzoic acids or substituted 2-alkylthio benzoic acids as follows:

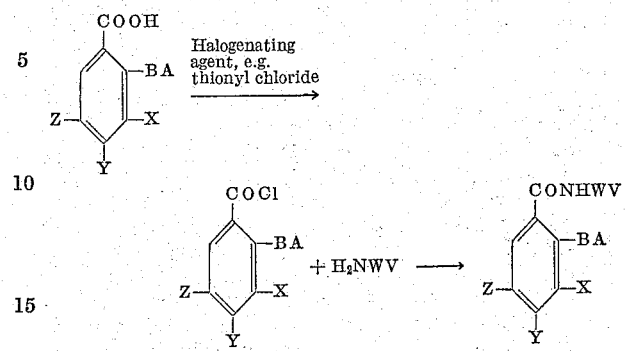

in which W, V, B, A, X, Y and Z have the same meanings as heretofore specified.

In the first stage, the substituted 2-alkoxy benzoic acid or substituted 2-alkylthio benzoic acid is converted to the corresponding acid chloride by treatment with an appropriate halogenating agent, such as thionyl chloride. In the second stage, the resulting substituted benzoyl halide obtained, such as the substituted benzoyl chloride, is reacted in an inert solvent with the disubstituted diamine so that the hydrohalide, such as the hydrochloride of the basic benzamide obtained may be recoverable in a relatively pure state by filtration or centrifugation. The disubstituted diamine used as a reactant has the formula:

Under these conditions, the hydrochloric acid formed, for example, in the course of the reaction neutralizes the tertiary amino function of the benzamide formed. Examples of inert solvents in which the reaction occurs are: acetone, methyl ethyl ketone, benzene, toluene and ether. The reaction is conducted at low temperature, a temperature between 0 and 5° C. giving good results.

The acid salts of the substituted 2-alkoxy benzamides and the substituted 2-alkylthio benzamides are produced by causing the benzamide base to react with an acid such as hydrochloric acid, hydrobromic acid, hydroiodic acid, phosphoric acid, sulfuric acid, citric acid, tartaric acid and lactic acid. Ethane sulfonic acid or acids, such as diphenylacetic acid, produce salts substantially insoluble in water and permit a slow absorption of the composition when administered, thereby effecting prolonged action of the composition.

The quaternary ammonium salts are obtained by reacting the substituted benzamide base with an aliphatic or aromatic agent such as methyl chloride, methyl bromide, methyl iodide, dimethyl sulfate, methyl benzene sulfonate, methyl p-toluene sulfonate, ethyl bromide, propyl bromide and benzyl chloride.

The substituted benzamides of this invention possess significant pharmacological properties and may be used for the treatment of emesis associated with many conditions, such as pregnancy and seasickness, and behavior disturbances. For this purpose, the substituted benzamides or their salts may be incorporated in or combined with pharmaceutically acceptable carriers.

A more comprehensive understanding of this invention is obtained by reference to the following examples.

EXAMPLE I

N-(2-diethylaminoethyl)-2-methoxy-5-dimethylsulfamoylbenzamide 69 grams (0.27 mole) of 2 - methoxy - 5 - dimethylsulfamoylbenzamide acid are heated for 2½ hours with 64 g. (0.54 mole) of thionyl chloride. The solution obtained is added while it is still warm to 250 cc. of petroleum ether. The 2-methoxy-5-dimethyl sulfamoylbenzoyl chloride is precipitated, centrifuged, washed with petroleum ether, and dried under vacuum. 72 grams of product are obtained, representing a yield of 97%.

The 72 g. of 2-methoxy-5-dimethyl-sulfamoylbenzoyl chloride are dissolved in 100 cc. of methyl ethyl ketone and introduced drop by drop in 30 g. (0.26 mole) of N,N-diethylethylene diamine previously dissolved in 200 cc. of methyl ethyl ketone, the temperature being maintained between 0 and 5° C. during the reaction.

The N - (2-diethylaminoethyl) - 2-methoxy-5-dimethyl sulfamoylbenzamide hydrochloride is precipitated, centrifuged and washed on the filter with methyl ethyl ketone. The yield is 86% of a product having a melting point of 133–134° C.

The corresponding N - (2-diethylaminoethyl)-2-methoxy - 5 - methylsulfamoylbenzamide hydrochloride is prepared in the same manner as described in this example except that 2-methoxy-5-methylsulfamoylbenzoic acid is used as the starting material instead of 2-methoxy-5-dimethylsulfamoylbenzoic acid.

EXAMPLE II

N-(2-diethylaminoethyl)-2-methoxy-5-sulfamoylbenzamide

This compound is prepared in the same manner as in Example I. Starting with 66 g. (0.3 mole) of 2-methoxy-5-sulfamoylbenzoic acid, 55 g. (80% yield) of N-(2-diethylaminoethyl) - 2 - methoxy-5-sulfamoylbenzamide are obtained, having a melting point of 183–185° C.

EXAMPLE III

N-(tertiary aminoalkyl)-2-methoxy-3,5-dichlorobenzamide salts 88 grams (0.4 mole) of 2-methoxy-3,5-dichlorobenzoic acid are heated on a water bath with 92 g. (0.8 mole) of thionyl chloride until totally dissolved, which requires about 8½ hours. The excess of thionyl chloride is expelled and the 2-methoxy-3,5-dichlorobenzoyl chloride formed is distilled. A yield of 72% is obtained, having a boiling point of 146–148° C. and a melting point of 42° C.

The 70 g. of acid chloride obtained (72% yield) are dissolved in 50 cc. of methyl ethyl ketone and poured drop by drop, at a temperature between 0 and 5° C., into a solution of 34 g. of N,N-diethylethylene diamine dissolved in 100 cc. of methyl ethyl ketone.

The N - (2-diethylaminoethyl)-2-methoxy-3,5-dichlorobenzamide hydrochloride formed crystallizes at the end of the reaction and solidifies into a mass. It is filtered and washed with methyl ethyl ketone. It is a white material with a melting point of 114–115° C. The yield is 89%. By crystallization in acetone (1 g. in 2 cc. of warm acetone), a very white material can be obtained.

By the same procedure described in this example, the following compounds may be prepared from 2-methoxy-3,5-dichlorobenzoyl chloride:

N - (2 - dimethylaminoethyl) - 2 - methoxy - 3,5 - dichlorobenzamide hydrochloride by reacting the acid chloride with N,N-dimethylethylene diamine. (Melting point of 80° C. with one molecule of water of crystallization; melting point of 147° C. in the anhydrous condition.)

N - (3 - diethylaminopropyl) - 2 - methoxy - 3,5 - dichlorobenzamide hydrochloride by reacting the acid chloride with γ-diethylamino propylamine. The melting point is 87–90° C.

N - (piperidinoethyl) - 2 - methoxy - 3,5 - dichlorobenzamide hydrochloride, by reacting the acid chloride with piperidino ethylamine. The melting point is 111–112° C.

N - (morpholinoethyl) - 2 - methoxy - 3,5 - dichlorobenzamide hydrochloride, by reacting the acid chloride with morpholinoethylamine. The melting point is 87–88° C.

N - (methyl - 4 - piperazinoethyl) - 2 - methoxy - 3,5-dichlorobenzamide hydrochloride by reacting the acid chloride with 4-methylpiperazino ethylamine. The melting point is 153° C.

The salts of N-(tertiary aminoalkyl)-2-methoxy-3-fluoro-5-chlorobenzamide may be prepared in a similar manner. For this purpose, 2-methoxy-3-fluoro-5-chlorobenzoic acid is employed instead of 2-methoxy-3,5-dichlorobenzoic acid as the starting material.

N - (diethylaminoethyl)-2-methylthio-3,5 dichlorobenzamide hydrochloride is produced in the same manner as described for the production of N-(diethylaminoethyl)-2-methoxy-3,5 dichlorobenzamide hydrochloride except that 2-methylthio-3,5-dichlorobenzoic acid is employed as the starting material instead of the 2-methoxy-3,5-dichlorobenzoic acid. N-(diethylaminoethyl)-2-methylthio-3,5 dichlorobenzamide hydrochloride has a $DL_{50}$ of 34.3 mg./kg. of body weight, as contrasted with a $DL_{50}$ of 29.6 mg./kg. of body weight for N-(diethylaminoethyl)-2-methoxy-3,5 dichlorobenzamide hydrochloride.

EXAMPLE IV

N-(2-diethylaminoethyl)-2-isopropyloxy-3,5-dichlorobenzamide

In a manner similar to that described in Example III, by starting with N-(2-diethylaminoethyl)-2-isopropyloxy-3,5-dichlorobenzoyl chloride and the N,N-diethylethylene diamine, there is obtained the phosphate of N-(2-diethylaminoethyl)-2-isopropyloxy-3,5-dichlorobenzamide, having a melting point of 113–115° C. in a yield of 81%; and likewise, starting with 2-ethoxy-3,5-dichlorobenzoyl chloride and N,N-diethylethylene diamine, there is obtained N - (2 - diethylaminoethyl) - 2 - ethoxy - 3,5 - dichlorobenzamide, the phosphate of which melts at 124° C.

EXAMPLE V

N-(2-diethylaminoethyl)-2-methoxy-3,5-dichlorobenzamide methiodide

To 87 g. (0.27 mole) of N-(2-diethylaminoethyl)-2-methoxy-3,5-dichlorobenzamide dissolved in 250 cc. of acetone, is added 38 g. (0.27 mole) of methyl iodide dissolved in 50 cc. of acetone. Rapid crystallization of methiodide occurs with heating. The mixture is cooled, allowed to stand for one night, centrifuged, washed in acetone and dried.

The methiodide of N-(2-diethylaminoethyl)-2-methoxy-3,5-dichlorobenzamide is recrystallized from 210 cc. of acetone. 120 grams of product having a melting point of 164–165° C. are obtained, representing a yield of 90%.

EXAMPLE VI

N-(2-diethylaminoethyl)-2-methoxy-3,5-dichlorobenzamide diphenylacetate 60 grams (0.17 mole) of N-(2-diethylaminoethyl)-2-methoxy-3,5-dichlorobenzamide hydrochloride are dissolved in 90 cc. of water. 36 grams (0.17 mole) of diphenylacetic acid are converted to the sodium salt by addition of 17 cc. of 10 N sodium hydroxide and 60 cc. of water. The two solutions are mixed. The crystallization is slow, requiring two days for completion. The precipitate is centrifuged and washed with water until the chloride ions disappear.

This salt, substantially insoluble in water, can be utilized in slow-acting therapeutic materials.

EXAMPLE VII

*N-(2-diethylaminoethyl)-2-methoxy-3,5-dibromobenzamide*

In the same manner as in Example III, by starting with 2-methoxy-3,5-dibromobenzoyl chloride and treating it with N,N-diethylethylene diamine, N-(2-diethylaminoethyl)-2-methoxy-3,5-dibromobenzamide is obtained.

67 grams (0.2 mole) of 2-methoxy-3,5-dibromobenzoyl chloride and 23 g. (0.2 mole) of N,N-diethylethylene diamine are reacted and the hydrochloride formed is dissolved in 300 cc. of water. It is made alkaline with 30 cc. of ammonia, and the liberated base extracted with 200 cc. of methylene chloride. The solution is washed with water. The methylene chloride is distilled off and 72 g. of base are obtained (87% yield) which are dissolved in 100 cc. of absolute alcohol. 30 grams of 85% phosphoric acid dissolved in 50 cc. of absolute alcohol are added. N-(2-diethylaminoethyl)-3,5-dibromobenzamide phosphate is precipitated, is centrifuged and washed. It is a clear beige material, having a melting point of 127–128° C.

EXAMPLE VIII

*N-(2-diethylaminoethyl)-2-methoxy-3-chloro-5-bromobenzamide*

In the same manner as in Example III, starting with 2-methoxy-3-chloro-5-bromobenzoyl chloride and the N,N-diethylethylene diamine, there is obtained N-(2-diethylaminoethyl) - 2 - methoxy - 3 - chloro - 5 - bromobenzamide phosphate. It is a clear beige material, having a melting point of 134–135° C.

EXAMPLE IX

*N-(2-diethylaminoethyl)-2-methoxy-3-bromo-5-chlorobenzamide*

In the same manner as in Example III, starting with 2-methoxy-3-bromo-5-chlorobenzoyl chloride and N,N-diethylethylene diamine, N-(2-diethylaminoethyl)-2-methoxy-3-bromo-5-chlorobenzamide phosphate is obtained. It is a solid white material having a melting point of 126–127° C.

EXAMPLE X

*N-(2-diethylaminoethyl)-2-methoxy-3-chloro-5-fluorobenzamide*

In the same manner as in Example III, starting with 2-methoxy-3-chloro-5-fluorobenzoyl chloride and N,N-diethylethylene diamine, N-(2-diethylaminoethyl)-2-methoxy-3-chloro-5-fluorobenzamide hydrochloride is obtained in a yield of 85%. It is a solid white material with a melting point of 125–126° C.

EXAMPLE XI

*N-(2-diethylaminoethyl)-2-methoxy-3-chloro-5-methoxybenzamide*

61 grams (0.281 mole) of 2,5-dimethoxy-3-chlorobenzoic acid are heated for 5 hours on a water bath with 67 g. (0.56 mole) of thionyl chloride. The excess of thionyl chloride is removed under vacuum. The 2,5-dimethoxy-3-chlorobenzoyl chloride formed crystallizes. It is recovered with 200 cc. of petroleum ether, centrifuged, washed with petroleum ether and dried over phosphorus pentoxide. 59 grams of product are obtained, representing a yield of 92%.

These 59 g. (0.25 mole) of acid chloride are dissolved in 150 cc. of acetone and poured drop by drop, at a temperature from 0 to 5° C., into 29 g. (0.25 mole) of N,N-diethylethylene diamine. There are added 800 cc. of water and 25 cc. of 30% soda. The base of N-(2-diethylaminoethyl) - 2 - methoxy-3-chloro-5-methoxybenzamide formed is precipitated and extracted with 400 cc. of methylene chloride. After evaporation of the solvent, there remain 55 g. of base representing a yield of 70%, which are dissolved in the cold in 50 cc. of alcohol. 20 grams of 85% phosphoric acid are added. The phosphate of substituted benzamide crystallizes, is centrifuged and washed with cold absolute alcohol. The product is a solid white material, having a melting point of 146–147° C.

EXAMPLE XII

*N-(2-diethylaminoethyl)-2-methoxy-4,5-dichlorobenzamide*

99 grams (0.44 mole) of 2-methoxy-4,5-dichlorobenzoic acid are added in three portions to 105 g. (0.9 mole) of thionyl chloride. The mixture is heated for three hours on a water bath at 50–60° C. The excess of thionyl chloride is expelled and 105 g. of 2-methoxy-4,5-dichlorobenzoyl chloride are obtained. After dissolution in 200 cc. of methyl ethyl ketone, the acid chloride is then poured drop by drop into 50 g. of N,N-diethylethylene diamine dissolved in 150 cc. of methyl ethyl ketone, the temperature being maintained between 0 and 4°. The crystallization of the N-(2-diethylaminoethyl)-2-methoxy-4,5-dichlorobenzamide hydrochloride begins after about ⅔ of the acid chloride has been introduced.

It is centrifuged after 2 hours of standing and washed on the filter with about 300 cc. of methyl ethyl ketone. The hydrochloride weighs 103 g.; the yield is 67%; and the melting point is 196–198° C. It is easily recrystallized from isopropyl alcohol.

EXAMPLE XIII

*N-(2-diethylaminoethyl)-2-methoxy-4-amino-5-chlorobenzamide*

80 grams (0.3 mole) of N-(2-diethylaminoethyl)-2-methoxy-4-aminobenzamide are dissolved in small portions in 150 cc. of acetic acid. The mixture is cooled and 45 g. (0.45 mole) of acetic anhydride are added, and the solution obtained is heated for two hours on a water bath. After cooling, the solution is decanted into a round-bottomed flask with a stirrer, a thermometer and a tube for introducing the chlorine. It is stirred and the current of chlorine is passed through, the temperature being maintained between 20 and 25° C. The stirring is continued for one hour after the completion of the absorption of the chlorine.

The mixture obtained is poured into 2 liters of water and the base is precipitated with 30% soda. The precipitated base is extracted with 400 cc. of methylene chloride. After evaporation of the solvent, the N-(2-diethylaminoethyl)-2-methoxy-4-acetamino-5-chlorobenzamide formed crystallizes. The melting point is 86–87° C. and the yield is 95%.

To obtain the corresponding amino derivative, 109 g. of base are heated under agitation in a round-bottomed flask with 300 cc. of 35–36% concentrated hydrochloric acid and 600 cc. of water. It is heated on a water bath until dissolution is complete, then maintained at boiling point for 90 minutes, cooled, diluted with 1 liter of water, and neutralized with about 350 cc. of 30% soda. The N-(2-diethylaminoethyl)-2-methoxy - 4 - amino-5-chlorobenzamide formed crystallizes, is centrifuged and washed in water. Its melting point is 122° C. and the yield is 74%.

To obtain the corresponding dihydrochloride, the base is dissolved in absolute alcohol (3 volumes) and to that solution is added 5 N alcoholic hydrochloric acid. The dihydrochloride precipitates, is centrifuged and washed with alcohol. It is a solid white material, having a melting point of 134–135° C.

N-(2-diethylaminoethyl)-2-methoxy - 4 - ethylamino-5-chlorobenzamide hydrochloride is produced by the same procedure as described in this example except that N-(2-diethylaminoethyl)-2-methoxy-4-ethylaminobenzamide is employed as the starting material. Likewise, if N-(2-diethylaminoethyl) - 2 - methoxy - 4 - diethylamino-5-chlorobenzamide hydrochloride is desired, the same method is employed, except that N-(2-diethylaminoethyl)-2-methoxy-4-diethylamino-5-chlorobenzamide is used as the starting material.

The N-(diethylaminoethyl)-2-methoxy-4-aminobenzamide used as the starting material in this example may be prepared from o-toluidine as described in the copending application of M. L. Thominet, S.N. 124,314, filed July 17, 1961. The o-toluidine is initially nitrated with nitric acid to produce 4-nitro-o-toluidine. The 4-nitro-o-toluidine is then converted to 2-hydroxy-4-nitro toluene by heating with nitrous acid. By reacting the resulting 2-hydroxy-4-nitro toluene with dimethyl sulfate, 2-methoxy-4-nitro toluene is formed. The 2-methoxy-4-nitro toluene is oxidized with potassium permanganate to produce 2-methoxy-4-nitrobenzoic acid. The latter substituted benzoic acid is treated with thionyl chloride to form 2-methoxy-4-nitrobenzoyl chloride. A methyl ethyl ketone solution of the 2-methoxy-4-nitro-benzoyl chloride is added over a period of about one and one-half hours to a methyl ethyl ketone solution containing an equal molecular quantity of N,N-diethylethylene diamine while stirring and maintaining the temperature between 0 and 5° C. The N-(diethylaminoethyl)-2-methoxy-4-nitrobenzamide hydrochloride formed precipitates. It is filtered, washed twice with methyl ethyl ketone, dissolved in alcohol, and reduced catalytically in an absolute isopropyl alcohol solution to form N-(diethylaminoethyl)-2-methoxy-4-aminobenzamide. The base is obtained by precipitating with sodium hydroxide.

EXAMPLE XIV

*N-(2-diethylaminoethyl)-2,4-dimethoxy-5-chlorobenzamide*

73 grams (0.337 mole) of 2,4-dimethoxy-5-chlorobenzoic acid are mixed with 80 g. (0.67 mole) of thionyl chloride. The mixture is heated for 5 hours. 2,4-dimethoxy-5-chlorobenzoyl chloride forms in a mass. This is made into a paste with petroleum ether, filtered and washed with petroleum ether. It is a white solid material having a melting point of 144° C. The yield is 74 g., representing a yield of 94%.

The 74 g. of acid chloride are dissolved in 150 cc. of acetone and added to 37 g. of N,N-diethylethylene diamine dissolved in 220 cc. of acetone. The operation is conducted at a temperature between 0 and 5° C. The N-(2-diethylaminoethyl)-2,4-dimethoxy-5-chlorobenzamide hydrochloride formed precipitates, is centrifuged and washed with 60 cc. of acetone. The product is a white solid having a melting point of 187° C. The yield is 85%.

EXAMPLE XV

*N-(2-diethylaminoethyl)-2,4,5-trimethoxybenzamide*

47 grams (0.22 mole) of 2,4,5-trimethoxybenzoic acid are added in 3 portions to 79 g. (0.44 mole) of thionyl chloride. The reaction is very vigorous. It is heated to about 60° C., the mass becoming liquid in about 4 hours. After cooling, the 2,4,5-trimethoxybenzoyl chloride is precipitated with 300 cc. of petroleum ether, is centrifuged and washed with petroleum ether. The yield is 47 g., representing a yield of 92%.

The acid chloride is dissolved in 300 cc. of ether and poured drop by drop, at a temperature between 0 and 5° C., into 24 g. of N,N-diethylethylene diamine dissolved in 150 cc. of ether. The N-(2-diethylaminoethyl)-2,4,5-trimethoxybenzamide formed precipitates and is centrifuged. 42 grams of product are obtained having a melting point of 158–159° C.

EXAMPLE XVI

*N-(2-diethylaminoethyl)-2-methoxy-3,4,5-trichlorobenzamide*

84 grams (0.33 mole) of 2-methoxy-3,4,5-trichlorobenzoic acid are poured into 118 g. of thionyl chloride (0.66 mole). This is heated for 7 hours on a water bath at 80° C. The excess of thionyl chloride is expelled and 88 g., representing a yield of 97% of 2-methoxy-3,4,5-trichlorobenzoyl chloride are obtained.

The acid chloride is dissolved in 120 cc. of acetone and poured drop by drop, at a temperature between 0 and 5° C. and into 38 g. of N,N-diethylethylene diamine dissolved in 150 cc. of acetone. 101 grams, representing an 83% yield of N-(2-diethylaminoethyl)-2-methoxy-3,4,5-trichlorobenzamide hydrochloride, precipitates, is centrifuged and washed on the filter with 100 cc. of acetone. It is a solid white material having a melting point of 92–93° C.

EXAMPLE XVII

*N-(2-diethylaminoethyl)-2-methoxy-4-fluorobenzamide*

To 89 g. (0.52 mole) of 2-methoxy-4-fluorobenzoic acid are added in small portions 124 g. (1.04 mole) of thionyl chloride. When all the acid is dissolved, the solution is heated for 2 hours on a water bath. The excess of thionyl chloride is distilled under vacuum. The 2-methoxy-4-fluorobenzoyl chloride crystallizes. The amount recovered is 81 g., representing a yield of 83%. The acid chloride is dissolved in 120 cc. of methyl ethyl ketone and poured drop by drop into 55 g. (0.475 mole) of N,N-diethylethylene diamine dissolved in 200 cc. of methyl ethyl ketone, the reaction mixture being maintained between 0 and 5° C. N-(2-diethylaminoethyl)-2-methoxy-4-fluorobenzamide hydrochloride precipitates. It is allowed to remain for 24 hours, is filtered and washed washed with methyl ethyl ketone. A white product is obtained having a melting point of 161° C. in a yield of 93%.

EXAMPLE XVIII

*N-(2-diethylaminoethyl)-2-methoxy-5-fluorobenzamide*

74 grams (0.42 mole) of 2-methoxy-5-fluorobenzoic acid are dissolved in the cold in 80 g. of thionyl chloride. 2-methoxy-5-fluorobenzoyl crystallizes immediately. The excess of thionyl chloride is removed under vacuum.

78 grams of the resulting acid chloride are dissolved in 90 cc. of methyl ethyl ketone. The solution of acid chloride is poured drop by drop while the temperature is maintained between 0 and 5° C., into 48 g. (0.42 mole) of N,N-diethylethylene diamine. The N,N-2-diethylaminoethyl-2-methoxy-5-fluorobenzamide hydrochloride precipitates, is centrifuged, and washed on the filter with methyl ethyl ketone. There are obtained 113 g. of product having a melting point of 161–162° C., representing a yield of 90%.

EXAMPLE XIX

*N-(2-diethylaminoethyl)-2-methoxy-4-amino-5-bromobenzamide*

To 119 grams (0.45 mole) of N-(2-diethylaminoethyl)-2-methoxy-4-aminobenzamide dissolved in 200 cc. of acetic acid are added in the cold in small portions 69 g. of acetic anhydride (0.45 mole+excess of 50%). The N-(2-diethylaminoethyl)-2-methoxy-4-aminobenzamide may be prepared as described in Example XIII. The solution obtained is heated for 2 hours on a water bath and then boiled for 15 minutes. It is cooled at 25° C. While agitating constantly and maintaining the temperature between 25 and 30° C., there is added to the solution drop by drop 72 g. of bromine dissolved in 60 cc. of acetic acid. It is agitated for one hour. The mixture obtained is added to one liter of water and the base is precipitated by the addition of 30% soda. The precipitated base is extracted with 40 cc. of methylene chloride. After evaporation of the solvent, the residue is boiled for 2 hours with 390 g. of concentrated hydrochloric acid in 780 cc. of water. It is cooled, diluted with one liter of water, 12 g. of charcoal are added, and the mixture filtered. The base is precipitated with 30% soda. The N-(2-diethylaminoethyl)-2-methoxy-4-amino-5-bromobenzamide formed crystallizes, is centrifuged and washed with water. A yield of 85 g. of base having a melting point of 129–130° C. is obtained.

To produce the dihydrochloride, the free base is dissolved in 110 cc. of absolute alcohol, 9.6 g. of dry hydrochloride acid dissolved in 35 cc. of alcohol are added, followed by 2.8 cc. of water. The dihydrochloride precipitates, is centrifuged, washed, and dried at 40° C. It was a solid white material having a melting point of 134–135° C.

EXAMPLE XX

*N-(2-diethylaminoethyl)-2-methylthio-3,5-dichlorobenzamide*

47 grams (0.18 mole) of 2-methylthio-3,5-dichlorobenzoic acid are introduced in small portions into 43 g. of thionyl chloride (0.36 mole). It is heated on a water bath at 40° C., then for 3 hours at 60–70° C. The excess of thionyl chloride is expelled under vacuum and 45 g. (98% yield) of 2-methylthio-3,5-dichlorobenzoyl chloride are obtained.

The acid chloride is dissolved in 22 cc. of methyl ethyl ketone and added drop by drop, the temperature being maintained between 0 and 5° C., into a solution of 21 g. of N,N-diethylethylene diamine in 113 cc. of methyl ethyl ketone. The N-(2-diethylaminoethyl)-2-methylthio-3,5-dichloro benzamide hydrochloride crystallizes during the reaction. When the reaction is terminated, the mixture is allowed to remain for 3 hours, is centrifuged, washed with 90 cc. of methyl ethyl ketone and dried at 100° C. There are obtained 59 g. of a solid white material, representing a yield of 88%, and with a melting point of 139–140° C.

Other thioalkyl compounds may be prepared in a similar manner. For example, N-(2-diethylaminoethyl)-2-propylthio-3,5-dichlorobenzamide hydrochloride is produced similarly by using 2-propylthio-3,5-dichlorobenzoic acid as the starting material instead of the 2-methylthio-3,5-dichlorobenzoic acid employed above.

What is claimed is:

1. A member selected from the group consisting of free bases and nontoxic salts thereof, said free base having the formula:

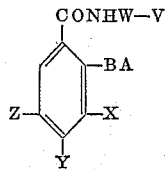

in which V is a member selected from the class consisting of radicals having the formulas:

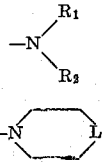

and

in which $R_1$ and $R_2$ are lower alkyl; L is a member selected from the class consisting of nitrogen, oxygen, methylene and radicals having the formula: NR in which R is selected from the class consisting of hydrogen, lower alkyl, and lower alkyl sulfamoyl; W is lower alkylene of 1 to 4 carbon atoms; A is lower alkyl; B is selected from the class consisting of sulfur and oxygen; and X, Y and Z are selected from the class consisting of hydrogen, halogens, lower alkoxy, amino, lower alkylamino, di lower alkylamino, lower alkanoyl, lower alkanoylamino, lower alkyl mercapto, the sulfamoyl, lower alkylsulfamoyl, di lower alkylsulfamoyl and halomethyl, at least two of the groups X, Y and Z being other than hydrogen.

2. A free base having the formula:

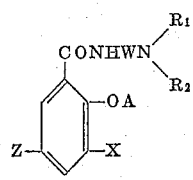

in which $R_1$ and $R_2$ are lower alkyl, W is alkylene, A is lower alkyl, and X and Z are halogen.

3. A base having the formula:

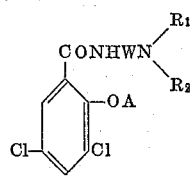

in which $R_1$ and $R_2$ are lower alkyl, W is alkylene, and A is lower alkyl.

4. N-(2-diethylaminoethyl)-2-methoxy-3,5-dichlorobenzamide hydrochloride.

5. N-(2-diethylaminoethyl)-2-methoxy-4-amino-5-bromobenzamide.

6. N-(2-diethylaminoethyl)-2-methoxy-4-amino-5-chlorobenzamide.

References Cited in the file of this patent

UNITED STATES PATENTS

| | | |
|---|---|---|
| 2,691,025 | Clinton et al. | Oct. 5, 1954 |
| 2,810,718 | Horrom et al. | Oct. 22, 1957 |
| 2,910,488 | Novello | Oct. 27, 1959 |

FOREIGN PATENTS

| | | |
|---|---|---|
| 797,476 | Great Britain | July 2, 1958 |

OTHER REFERENCES

Kurihara et al.: Tohaku Yakka Dargaku Kiyo, vol. 6, pp. 59–69 (1959), cited in Chemical Abstracts, vol. 54, pp. 19576–19577 (1960).

Schiemerz et al.: Chemische Berichte, vol. 92, pp. 857–862 (1959).

Bupchi et al.: Helv. Chima. Acta., vol. 34, pp. 1002–1013 (1951).